(No Model.) 2 Sheets—Sheet 1.
F. L. SLOCUM.
METHOD OF AND APPARATUS FOR SCRUBBING GAS.
No. 551,695. Patented Dec. 17, 1895.
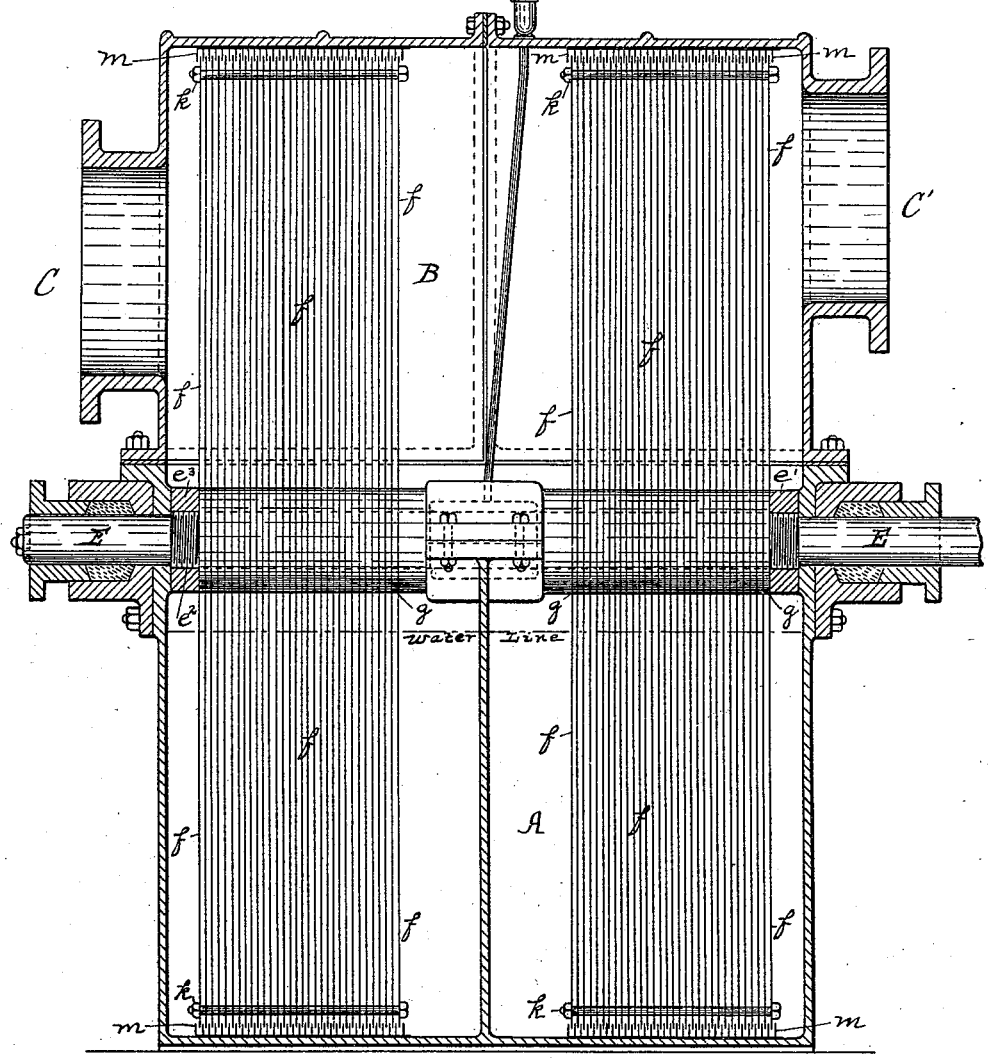
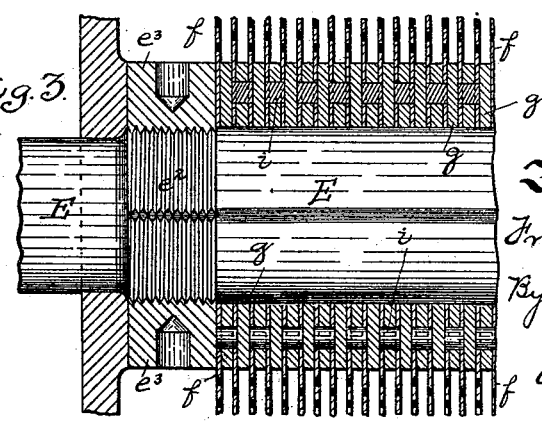

(No Model.) 2 Sheets—Sheet 2.
F. L. SLOCUM.
METHOD OF AND APPARATUS FOR SCRUBBING GAS.
No. 551,695. Patented Dec. 17, 1895.
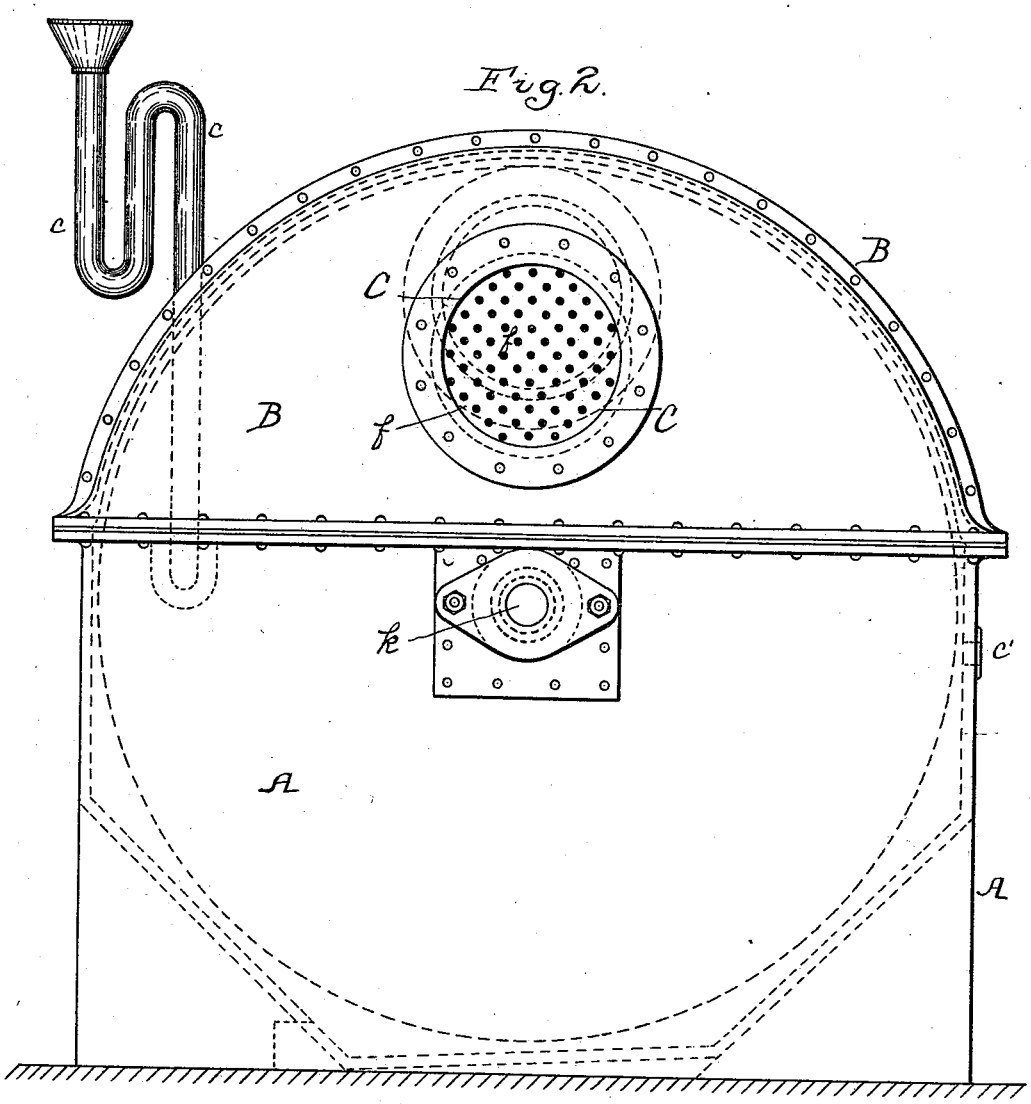
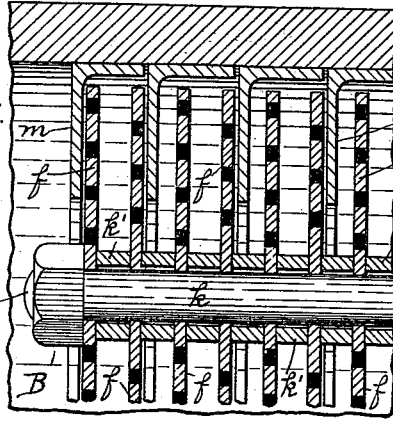

United States Patent Office.

FRANK L. SLOCUM, OF PITTSBURG, PENNSYLVANIA.

METHOD OF AND APPARATUS FOR SCRUBBING GAS.

SPECIFICATION forming part of Letters Patent No. 551,695, dated December 17, 1895.

Application filed October 7, 1893. Serial No. 487,475. (No model.)

*To all whom it may concern:*

Be it known that I, FRANK L. SLOCUM, a resident of Pittsburg, in the county of Allegheny and State of Pennsylvania, have invented a new and useful Improvement in Methods of and Apparatus for Scrubbing Gas; and I do hereby declare the following to be a full, clear, and exact description thereof.

My invention relates to the scrubbing or purifying of gases, such as the removal of ammonia, tar, and other impurities from illuminating-gas, or the removal of benzole or other vapors from gases.

The object of the invention is to provide for the rapid and effective scrubbing and washing of the gases, and for that purpose to bring the gases into contact with the absorbent liquid in such a way as to not only insure the contact of the gases with the liquid but the breaking up of the globules of tar and other extraneous matter, and also to prevent the diffusion of the purified gases with those less purified, so as to provide for a more perfect scrubbing and purifying of the gases.

To these ends my invention consists, generally stated, in forcing the gas through a series of perforated disks set within one-half inch of each other and brought under such pressure as to cause the gas passing through one disk to strike against the solid portions of the next disk with impact sufficient to bring the gas into intimate contact with the wetted surface and break up the globules of tar and other extraneous matter contained in the gas and forcing the layer of gas between one set of disks through into the space between the next set of disks without permitting diffusion between the layers of gas, as hereinafter more fully described.

It also consists in an apparatus for scrubbing or purifying the gas, having within an inclosing case a series of perforated disks mounted to rotate and dip into the absorbent liquid, the disks being set within one-half inch of each other, and the perforations of one disk being out of line with those of the adjoining disk so as to accomplish the results above briefly stated.

To enable others skilled in the art to practice my invention, I will describe the same more fully, referring to the accompanying drawings, in which—

Figure 1 is a longitudinal vertical section of the apparatus embodying my invention. Fig. 2 is an outside view of the case. Fig. 3 is a view showing the disk attached to the central shaft. Fig. 4 is a full-sized view of the upper end of some of the disks.

Like letters of reference indicate like parts in each.

The apparatus, as illustrated, is inclosed in a cast-metal casing which may be formed of as many sections as desired, and in the drawings this casing is shown as composed of the lower part A and the upper part B, which may be formed in one or more parts or shells and fits upon the lower shell and is connected thereto by flanges so as to make gas-tight joints. The upper shell has the inlet-port C and the outlet C' with which the gas-pipes connect to carry the gas to and from the scrubber.

The series of disks employed in practicing the invention may be mounted to rotate in any desired way so long as they embody the principles of the invention, as above indicated. I prefer, however, to construct the same as illustrated in the drawings—a series of flat circular disks which are mounted in a central horizontal shaft mounted in the casing, this being the simplest and most desirable form of the invention. The casing is also provided with a suitable feeding-pipe $c$ for the absorbent liquid, which has a suitable goose-neck or like seal to prevent the flow of the gases backward through the feeding-pipe, and has a suitable overflow pipe or opening $c'$ which can be controlled in the same manner, thus providing for the introduction of an absorbing liquid into the casing, such liquid being maintained at a suitable height therein.

As the bearings for the shaft carrying the series of disks do not form any part of the present invention, it will not be necessary to describe them in detail.

On the shaft E is secured a series of circular disks $f$, the number of such disks varying according to the size of the washer, but it being preferred to employ two sets of such disks, though the washer can be enlarged by additional sets or groups, as found desirable. These disks are placed close to each other to obtain the peculiar result aimed at—namely, such impact of the gases passing from one disk against the other as to insure the contact of the gases with the wetted surface of the disk and the absorbing of the ammonia or other vapors from the same, the breaking up of the globules of tar and other extraneous matter, and the carrying of the gases through the apparatus without permitting the diffusion of the gas between one set of disks with the gas between the adjoining sets. For this purpose I find by actual practice that it is necessary the disks be placed no farther apart than one-half inch, and that to produce the best results the disks should be placed even closer than that, such as about within one-fourth inch of each other. The disks are also secured upon the driving-shaft in such manner that the perforations in the one disk are out of line with the perforations in the adjoining disks, so that the gas passing through the perforations in one disk will be projected against the solid portions of the adjoining disk in order to produce the results above referred to. The disks may be secured upon the driving-shaft in any suitable way, the several disks forming the series being shown as placed around the driving-shaft with collars $g$ between them, and the collars being the proper width to form the spacings between the disks and hold them in proper line. It is desirable that the disks and collars be keyed to the driving-shaft and locked together, and for this purpose the driving-shaft is preferably formed with a groove, and both collars and disks have V-shaped projections fitting in such groove, and besides this the disks and collars having perforations formed therein in line with each other in which pins or blocks $i$ fit, the blocks corresponding in diameter to the perforations, and preferably having a length equal to the thickness of one of the collars and two of the disks, so that when placed in such perforations the blocks or pins will pass through one collar and the two adjoining disks and be held in place by the solid bodies of the collars on the other side of the disks, and so act to lock the disks to that particular collar. In this way all of the disks and collars are locked together, and one disk is locked to the collar on one side at one point and to the collar on the other side at another point, so that the entire series of collars are united together by means of pins or blocks extending through and confined between them. The shaft E has a shoulder $e'$ at one end thereof against which the end disk of the series bears, and at the other end of the series near the outer end of the shaft the shaft is threaded, as at $e^2$, and a nut $e^3$ engages with such thread and forces the several disks and collars firmly into contact with each other, so firmly binding the collars and disks upon the shaft. The disks are also connected together at suitable points near their outer edges, the construction employed for this purpose being bolts $k$ extending through the disks at such points, and ferrules $k'$ placed between the disks around the collars, such ferrules corresponding in length to the thickness of the collars $g$, and the whole being clamped together by means of the bolts. The disks are provided with numerous small perforations which are bored or stamped therein throughout their entire surface, through which perforations the gas passes, as above referred to, and the disks being so secured upon the shaft that the perforations in one disk are opposite the solid portions of the other, or are out of line with the perforations in the other, to produce the action above referred to, the perforations also serving to carry up the water or other absorbent liquid which holds to the surface of the disks and within such perforations by capillary action, the water within such perforations being forced from the same by the gas passing through the perforations, which is thus brought into intimate contact with the water and is one means of absorbing the soluble vapors therefrom. The shape of the perforations may be varied, if desired, being circular or of slot form, the former being found more desirable. The perforations are made comparatively small, so that as the gas passes through them there will be such a compression of the gas as to cause it to pass with considerable velocity through the perforations and insure its being projected against the surface of the adjoining disk, the necessary pressure to produce this result being obtained for the reason that the surface area of the perforations in the disks is not as great as that of the inlet-port of the casing. As the gases might flow around the outer edges of the disk, or at least escape contact with the absorbing liquid, suitable means of preventing this are provided—such, for example, as ribs $m$ secured to the inner surface of the upper shells and extending down between the several series of disks, one edge of each rib fitting close to the face of each disk so as to leave but a slight space between them and prevent the passage of any great portion of gas around the outer edge of the disk, which, as this itself is coated with liquid, will carry the liquid up into contact with the rib, and any gas passing between the rib and disk will be brought into close contact with the rib, which will act to absorb the soluble vapor. The lower case or shell is provided with suitable tapping-openings for the tapping off of any tar or like substance which may be removed from the gases and gather in the lower body of the shell.

In practicing my invention with the apparatus above described, where it is desired to remove ammonia from the ordinary illuminating-gas, water is fed through the lower part of the casing, a proper current being maintained for carrying the water as it is charged with the ammonia, and the water being fed to the apparatus in such way that the water passes in the opposite direction to the gas, so that the gases are always passing into contact with purer water carried up by the disks, and for this purpose the lower shell can be divided into any suitable number of compartments to separate the body of water into which the lower parts of the disks enter, the water flowing from one compartment to the other toward the forward end of the machine. Where oil or other absorbent liquid, such as for the absorption of benzole, is employed, it is introduced in the same way. The liquid is preferably maintained to the height just under the lower edge of the driving-shaft. The gas passes into the casing through the inlet-opening C and it strikes against the first one of the perforated disks, and in order to pass through the perforations of such disk its speed is accelerated, because the sum of the area of such perforations through which such gas can pass is not equal to the area of the inlet-port, and for this reason the gas will pass with considerable velocity through the perforations and it will be projected against the surface of the adjoining disk, the same acceleration of speed being maintained throughout the entire series of disks as the gas passes through them in succession. As the disks rotate within the casing they pass down into the liquid and are coated thereby, and the perforations in the disk are filled or nearly filled with the liquid, the liquid being held within the perforations and adhering to the surface of the disk by capillary action, so that a large body of liquid is carried up by the disks at each revolution of the driving-shaft. As the gas passes through the perforations of the disks it is of course brought into intimate contact with the liquid in the perforations, and it is in some cases necessary that the gas shall even force the liquid out of the perforations in order to pass through the same, and in this way the gases are brought into such contact with the liquid as to absorb the soluble vapors therefrom, while at the same time the forcing of the liquid from the perforations also acts to maintain, as it were, a shower of liquid between the disks, which has practically the same effect as the spraying of water, so that the liquid thus displaced descends in a fine spray through the gases into the body below. As the disks are close to each other, the distance as above stated being one-half inch, or less, and as the gases are compressed and forced with accelerated speed through the perforations, it is evident that in passing through such short distance the gas will be projected in fine jets against the next adjoining disk, and as the perforations of one disk are opposite the solid portions of the other, these jets of gas will strike against the next adjoining disk with considerable force, so that the gas is projected against the wetted surface of the adjoining disk and all the particles of gas are thus brought positively into intimate contact with the wetted surface of such disk, so insuring the absorbing of the ammonia or other vapors therefrom. At the same time, by being projected with such speed against the adjoining disk, any globules of tar or other extraneous matter contained in the gas are broken up by contact with the solid surface of the disk and are deposited thereon and carried down into the absorbent liquid, where the tar or such matter gathers, and from which it can be removed. It is found that to produce this peculiar result it is necessary that the perforations in the disks shall be placed at least within one-half inch of each other, and that the tar cannot be removed, and the vapors are only very imperfectly eliminated unless the disks are set within such distance of each other, because under the ordinary pressure at which the gas is carried throughout the apparatus the speed of the jets of gas would not be sufficient to bring the gas with such force against the adjoining disk as to break up the globules of tar, or other matter, or to bring the gases into such intimate contact with the wetted surface of the disks to insure the absorbing of the vapors therefrom; but as the gas spreads, as soon as it passes through the perforations, it would become diffused through the gas held between the disks, as the force would not be sufficient to bring it into contact with the opposite disk. Where the disks are placed so close to each other, however, the gases are projected against the disks with sufficient force to produce this action, and it is preferable to place them even closer, such as within one-fourth inch, so that the gas will vibrate back and forth against the surface of the two disks, so being brought again and again in contact with the wetted surface thereof. I am also enabled by holding the gas in a thin sheet between the disks to carry forward the gas in sheets or layers without permitting the diffusion of the gas between one set of disks with the gases between the adjoining disks, and in this way to prevent the intermingling of the less purified gas with that which has been subjected to a greater purifying action, the pressure of the gas passing into the space between the disks forcing the other gas ahead of it without diffusing with it, so that each layer of gas is carried in practically a separate sheet or body farther through the apparatus and into contact with cleaner water. The preventing of the diffusion of the gas in the spaces between the disks is of very great importance in the scrubbing or purifying thereof, because in case of such diffusion gas which has reached a more advanced state of purification may be contaminated by the less purified gas, and there is no surety that the gas passing from the scrubbers is pure and free from tar, vapor, or other extraneous matter.

What I claim as my invention, and desire to secure by Letters Patent, is—

1. The herein-described method of purifying gas, consisting in forcing the gas through a series of perforated disks set within one-half inch of each other and coated with an absorbent liquid, under such pressure as to cause the gas passing through one disk to strike against the solid portions of the adjoining disk with impact sufficient to break up the globules of tar or other extraneous matter contained in the gas, and forcing the layer of gas between one set of disks through into the space between the next set of disks without permitting diffusion between the layers of gas, substantially as and for the purposes set forth.

2. In gas washing or scrubbing apparatus, the combination of an inclosing case having inlet and outlet ports, a series of perforated disks mounted to rotate and dip into liquid, the disks being set within one-half inch of each other and the perforations of one disk being out of line with those of the adjoining disk, substantially as and for the purposes set forth.

In testimony whereof I, the said FRANK L. SLOCUM, have hereunto set my hand.

FRANK L. SLOCUM.

Witnesses:
JAMES I. KAY,
ROBT. D. TOTTEN.